United States Patent
Morris

(10) Patent No.: US 10,823,304 B2
(45) Date of Patent: Nov. 3, 2020

(54) FREEZE PREVENTION VALVE

(71) Applicant: Triteck Limited, Kowloon (HK)

(72) Inventor: Peter John Morris, Canning Vale (AU)

(73) Assignee: TRITECK LIMITED, Kowloon (HK)

(*) Notice: Subject to any disclaimer, the term of this patent is extended or adjusted under 35 U.S.C. 154(b) by 0 days.

(21) Appl. No.: 16/310,304

(22) PCT Filed: Jun. 16, 2017

(86) PCT No.: PCT/AU2017/050611
§ 371 (c)(1),
(2) Date: Dec. 14, 2018

(87) PCT Pub. No.: WO2017/214685
PCT Pub. Date: Dec. 21, 2017

(65) Prior Publication Data
US 2019/0186648 A1    Jun. 20, 2019

(30) Foreign Application Priority Data

Jun. 17, 2016 (AU) .............................. 2016902375

(51) Int. Cl.
*E03B 7/10* (2006.01)
*F16K 31/00* (2006.01)
(Continued)

(52) U.S. Cl.
CPC ............ *F16K 31/002* (2013.01); *F16K 31/50* (2013.01); *F24S 40/70* (2018.05)

(58) Field of Classification Search
CPC .. F16K 31/002; F16K 17/38; Y10T 137/1353; Y10T 137/7737
See application file for complete search history.

(56) References Cited

U.S. PATENT DOCUMENTS 2,419,630 A * 4/1947 Cruzan ................. F01M 1/12
236/34.5
2,762,569 A * 9/1956 Caillol .................. F24S 10/00
236/20 R
(Continued)

FOREIGN PATENT DOCUMENTS

AU       5810280 A    11/1980
AU    2010100668 A4    7/2010
(Continued)

OTHER PUBLICATIONS

Australian Patent Office International-Type Search Report issued in Australian provisional patent application No. 2016902375, dated Jun. 14, 2017, 15 pages.
(Continued)

*Primary Examiner* — Reinaldo Sanchez-Medina
(74) *Attorney, Agent, or Firm* — Miller Nash Graham & Dunn LLP

(57) ABSTRACT

A freeze prevention valve comprising a body having an inlet (14) and an outlet (16) for fluid to exit the valve in an open condition, a valve seat (18) provided adjacent an opening (22) of the valve, a piston member (20) that is movable in the body, the piston member comprising a piston shaft and a piston head (24), the piston head (24) arranged to seat against the valve seat (18) in a closed condition of the valve, a temperature sensing device (26) comprising a temperature sensitive element (28), operatively associated with the piston head (24), wherein the temperature sensitive element contracts and expands when the temperature of the fluid sensed by the temperature sensing device decreases or increases, wherein contraction of the temperature sensitive element allows the return spring (30) to move the piston member to unseat the piston head from the valve seat and thereby open the valve.

15 Claims, 6 Drawing Sheets

(51) Int. Cl.
*F16K 31/50* (2006.01)
*F24S 40/70* (2018.01)

(56) References Cited

U.S. PATENT DOCUMENTS

| | | | | |
|---|---|---|---|---|
| 3,618,625 | A | * | 11/1971 | Walters .................. A01K 7/025 137/62 |
| 3,662,950 | A | * | 5/1972 | McIntosh .............. F16K 17/003 236/92 C |
| 4,296,770 | A | | 10/1981 | Rice |
| 4,460,006 | A | | 7/1984 | Kolze |
| 4,541,448 | A | * | 9/1985 | Kolze ..................... F16K 17/38 126/588 |
| 4,557,252 | A | | 12/1985 | Dinh |
| 4,681,088 | A | * | 7/1987 | Cromer .................. F16K 17/38 126/588 |
| 4,784,173 | A | * | 11/1988 | Carney ..................... E03B 7/12 137/2 |
| 5,628,285 | A | | 5/1997 | Logan et al. |
| 2010/0032594 | A1 | | 2/2010 | Lamb et al. |
| 2014/0352812 | A1 | | 12/2014 | Dulin |
| 2015/0034171 | A1 | * | 2/2015 | Morris .................. F16K 17/048 137/15.17 |

FOREIGN PATENT DOCUMENTS

| WO | 0225150 A1 | 3/2002 |
|---|---|---|
| WO | 2010016816 A1 | 2/2010 |
| WO | 2011133166 A1 | 10/2011 |

OTHER PUBLICATIONS

International Search Report issued in International Application No. PCT/AU2017/050611, dated Aug. 3, 2017, 5 pages.
International Preliminary Report on Patentability and Written Opinion of the International Search Authority issued in International Application No. PCT/AU2017/050611, dated Dec. 18, 2018, 7 pages.
Extended European Search Report issued in European Patent Application No. 17812327, dated Feb. 12, 2020, 7 pages.

* cited by examiner

FREEZE PREVENTION VALVE

CROSS-REFERENCE TO RELATED APPLICATIONS

This application is a national stage filing under 35 U.S.C. § 371 of International Application No. PCT/AU2017/050611, filed Jun. 16, 2017, entitled A FREEZE PREVENTION VALVE, and claims priority from Australian Provisional Patent Application No. 2016902375 filed Jun. 17, 2016, the disclosures of both of which are incorporated herein by reference in their entirety.

Throughout this specification, unless the context requires otherwise, the word "comprise" and variations such as "comprises", "comprising" and "comprised" are to be understood to imply the presence of a stated integer or group of integers but not the exclusion of any other integer or group of integers Throughout the specification unless the context requires otherwise, the word "include" or variations such as "includes" or "including", will be understood to imply the inclusion of a stated integer or group of integers but not the exclusion of any other integer or group of integers.

The headings and subheadings in this specification are provided for convenience to assist the reader, and they are not to be interpreted so as to narrow or limit the scope of the disclosure in the description, claims, abstract or drawings.

TECHNICAL FIELD

The present invention relates to a valve. In particular, the present invention relates to a freeze prevention valve.

By way of example, a particular use of the valve of the present invention may be with a solar collector panel to prevent freezing of the water in the solar collector panel, which would cause damage to the solar collector panel.

BACKGROUND ART

Any discussion of background art, any reference to a document and any reference to information that is known, which is contained in this specification, is provided only for the purpose of facilitating an understanding of the background art to the present invention, and is not an acknowledgement or admission that any of that material forms part of the common general knowledge in Australia or any other country as at the priority date of the application in relation to which this specification has been filed.

Solar collector panels are used to collect solar radiation to heat water for hot water storage units at domestic and commercial sites. Whilst such installations are most suitable to geographic locations having sufficient sunshine to be able to heat the water, it is nevertheless possible that some of these geographic locations can experience cold ambient temperatures that can fall below 0° C. If this occurs, water in the solar collector panel can freeze causing damage to the solar collector panel, requiring repair or replacement of the solar collector panel. Consequently, it is advantageous that water does not freeze in the solar collector panel.

SUMMARY OF INVENTION

In accordance with one aspect of the present invention, there is provided a freeze prevention valve comprising
 a body,
 the body having an inlet for fluid to enter the valve and an outlet for fluid to exit the valve in an open condition of the valve,
 a valve seat provided adjacent an opening in the body of the valve,
 a piston member that is movable in the body of the valve, the piston member comprising a piston shaft and a piston head, the piston head arranged to seat against the valve seat in a closed condition of the valve and unseat from the valve seat in the open condition of the valve,
 a temperature sensing device, operatively associated with the piston head, the temperature sensing device comprising a temperature sensitive element, wherein the temperature sensitive element contracts when the temperature of a fluid sensed by the temperature sensing device decreases and expands when the temperature of the fluid sensed by the temperature sensing device increases,
 a return spring to bias the piston member in a first direction to the open condition of the valve,
 the valve having an upstream side and a downstream side which are not in fluid communication in the closed condition of the valve and which are in fluid communication in the open condition of the valve,
 wherein the temperature sensing device is provided on the upstream side and the return spring is provided on the downstream side, and
 wherein, in use, when the temperature of the fluid sensed by the temperature sensing device falls below a first level, contraction of the temperature sensitive element allows the return spring to move the piston member to unseat the piston head from the valve seat and thereby open the valve to allow fluid to pass through the valve, and when the temperature of the fluid sensed by the temperature sensing device rises above a first level, expansion of the temperature sensitive element moves the piston member in a second direction, opposed to the first direction, to seat the piston head on the valve seat and thereby returns the valve to the closed condition to prevent fluid to pass through the valve.

Preferably, the piston head is provided on the upstream side.

Preferably, the piston shaft is provided on the downstream side.

Preferably, the valve further comprises a temperature sensitive element spring to bias the temperature sensitive element in the second direction.

Preferably, the operative association of the temperature sensing device with the piston head comprises the temperature sensitive element being in direct or indirect abutment with the piston head.

Preferably, the body comprises at least a first body part and a second body part that are rotatably connected together.

Preferably, the body further comprises a housing to retain the temperature sensing device.

Preferably, at least one seal is provided between the first body part and the second body part, in use, to prevent fluid leaking between the first body part and the second body part from inside the body.

Preferably, the piston head is provided with a seal which contacts the valve seat to close the valve to thereby prevent passage of fluid through the valve.

Preferably, the valve further comprises manually operable control means that is operable to unseat the piston head from the valve seat to move the valve from the closed condition to the open condition to permit fluid to pass through the valve. This permits the valve to be opened and fluid to pass through the valve in a flushing operation, even if the temperature of the fluid sensed by the temperature sensing device has not fallen below the first level.

Preferably, the valve further comprises an overpush spring, wherein when the manually operable control means is operated to unseat the piston head from the valve seat to move the valve from the closed condition to the open condition, the temperature sensing device moves in the first direction, and wherein when the manually operable control means is operated to allow the piston head to re-seat on the valve seat, the overpush spring acts to bias the temperature sensing device in the second direction such that the piston head seats on the valve seat to return the valve to the closed condition to prevent fluid from passing through the valve.

In accordance with another aspect of the present invention, there is provided a solar collector panel having a valve, as herein before described, connected thereto such that, in use, if the temperature of the water in the solar collector panel sensed by the temperature sensing device falls below the predetermined level, water from the solar collector panel exits the valve via the outlet of the valve and is replaced by warmer water from a hot water storage tank that is connected to the solar collector panel.

Preferably, the temperature sensitive element is provided in a casing, and the casing is entirely exposed to the water in the solar collector panel.

Preferably, the predetermined level is substantially 3° C.

Preferably, the portion of the valve that is outside the solar collector panel is insulated with insulation material to reduce heat loss from the water in the solar collector panel via the valve.

BRIEF DESCRIPTION OF DRAWINGS

The present invention will now be described, by way of example only, with reference to the accompanying drawings, in which.

DESCRIPTION OF EMBODIMENTS

Figure 1:
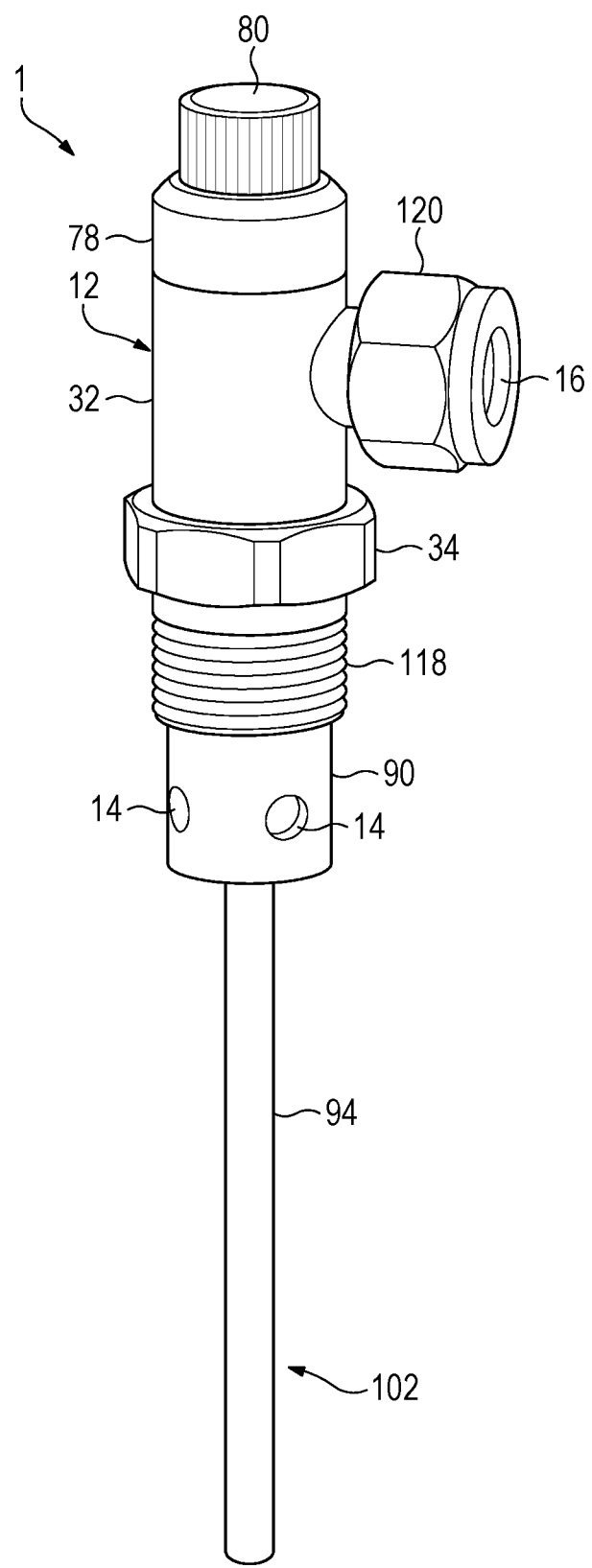
FIG. 1 is a perspective view of an embodiment of a valve in accordance with the present invention.

In the drawings, there is shown an embodiment of valve 1 in accordance with the present invention. The valve 1 is a freeze (or frost) prevention valve (which also may be referred to as freeze (or frost) protection valve) that prevents freezing of a fluid. Typically, this is an external fluid that is contained in a reservoir to which the valve 1 is connected. In the embodiment that is described herein, the reservoir is a solar collector panel 200.

The valve 1 comprises a body 12, which has an inlet 14 for fluid to enter the valve 1 and an outlet 16 for fluid to exit the valve 1 in the open condition of the valve.

The valve 1 also comprises a valve seat 18 and a piston member 20 in the body 12. An opening 22 is provided in the body 12 of the valve 1. The valve seat 18 is provided adjacent the opening 22. The piston member 20 comprises a piston shaft 23 and a piston head 24. The piston head 24 is provided at an end of the piston shaft 23. The piston head 24 is arranged to seat against the valve seat 18 in a closed condition of the valve 1 and unseat from the valve seat 18 in an open condition of the valve 1.

The valve seat 18 and/or opening 22 may be considered as marking the separation between the upstream side (indicated by arrow U in FIG. 2) and the downstream side (indicated by arrow D in FIG. 2) of the valve 1. The upstream side is the side that is nearest to the inlet 14. The downstream side is the side that is nearest to the outlet 16. Consequently, the upstream side alternatively may be referred to as the inlet side and the downstream side alternatively may be referred to as the outlet side.

In the closed condition of the valve 1, the opening 22 is blocked, or occluded, by the piston head 24 such that the upstream side U and the downstream side D are not in fluid communication. In contrast, in the open condition of the valve 1, the opening is not blocked, or not occluded, by the piston head 24 such that the upstream side U and the downstream side D are in fluid communication, such that fluid may flow from the upstream side U, through the opening 22, to the downstream side D and exit from the outlet 16.

The valve seat 18 surrounds the opening 22.

The piston shaft 23 is provided at the downstream side of the valve seat 18 and opening 22, such that it is able to move toward and away from the valve seat 18 on the downstream side of the valve seat 18.

In contrast, the piston head 24 is provided at the upstream side of the valve seat 18 and opening 22, such that it is able to move toward and away from the valve seat 18 on the upstream side of the valve seat 18.

The valve 1 also comprises a temperature sensing device 26 that is operatively associated with the piston head 24. The temperature sensing device 26 comprises a temperature sensitive element 28 that is able to contract, or shrink, with decreases in temperature of a fluid sensed by the temperature sensing device 26 and expand with increases in temperature of the fluid sensed by the temperature sensing device 26. The temperature sensing device 26 is provided at the upstream side U of the valve seat 18 and opening 22.

Figure 3:
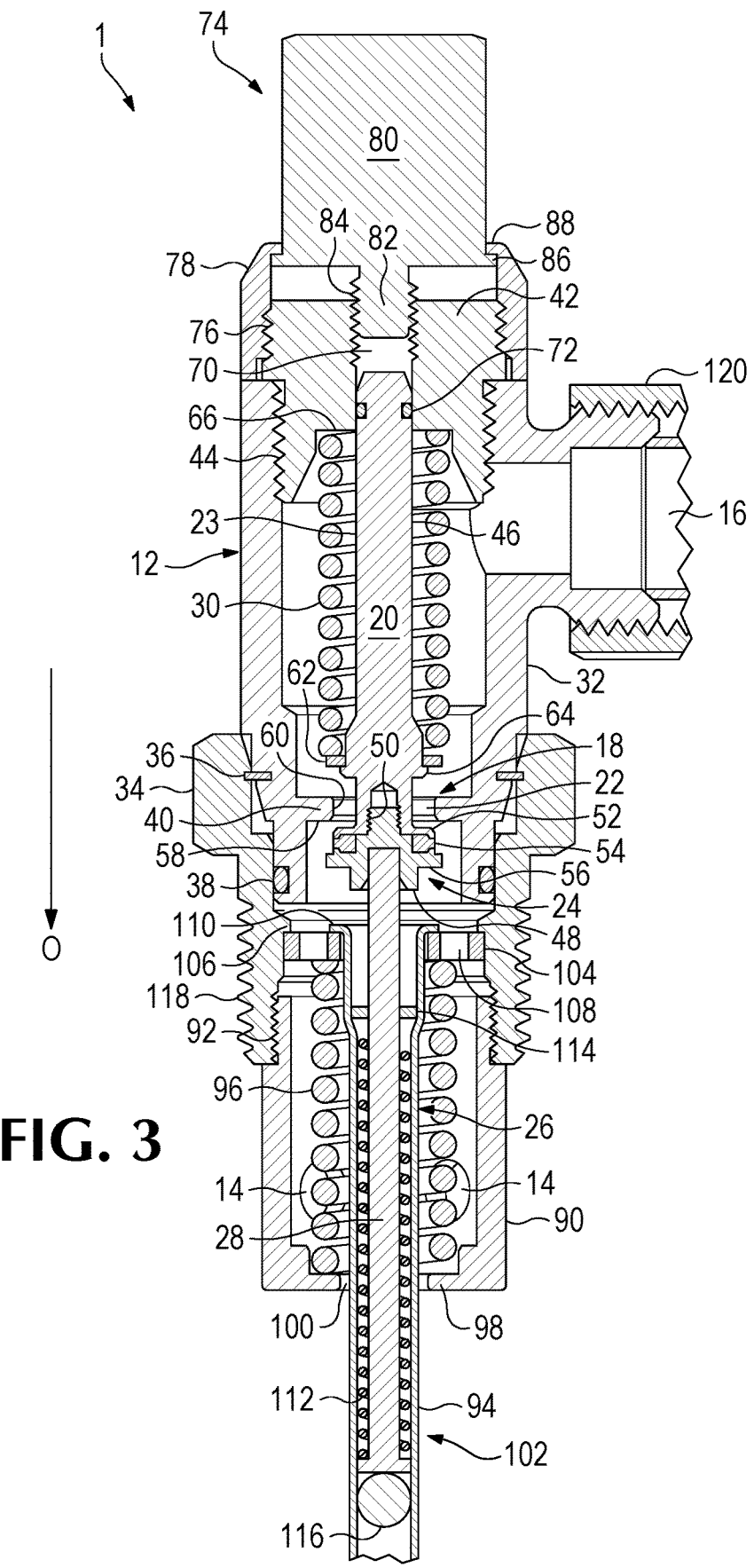
FIG. 3 is a second cross-sectional view of the valve shown in FIG. 1 in the open (draining) condition.

The valve 1 further comprises a first spring (also referred to herein as a return spring) 30. The return spring 30 is provided around the piston shaft 23. The return spring 30 acts to bias the piston member 20 in a first direction (shown by the arrow 0 in FIG. 3) to the open condition of the valve 1. The first direction (shown by arrow 0 in FIG. 3) is the direction toward the inlet 14 (i.e. away from the outlet 16) or toward the upstream side U (i.e. away from the downstream side D). The first spring 30 is provided at the downstream side D of the valve seat 18 and opening 22.

Thus, the piston shaft 23 and the first spring 30, on the one hand, and the temperature sensing device 26 and the piston 24, on the other hand, are provided on opposite sides of the valve seat 18 and the opening 22.

Figure 2:
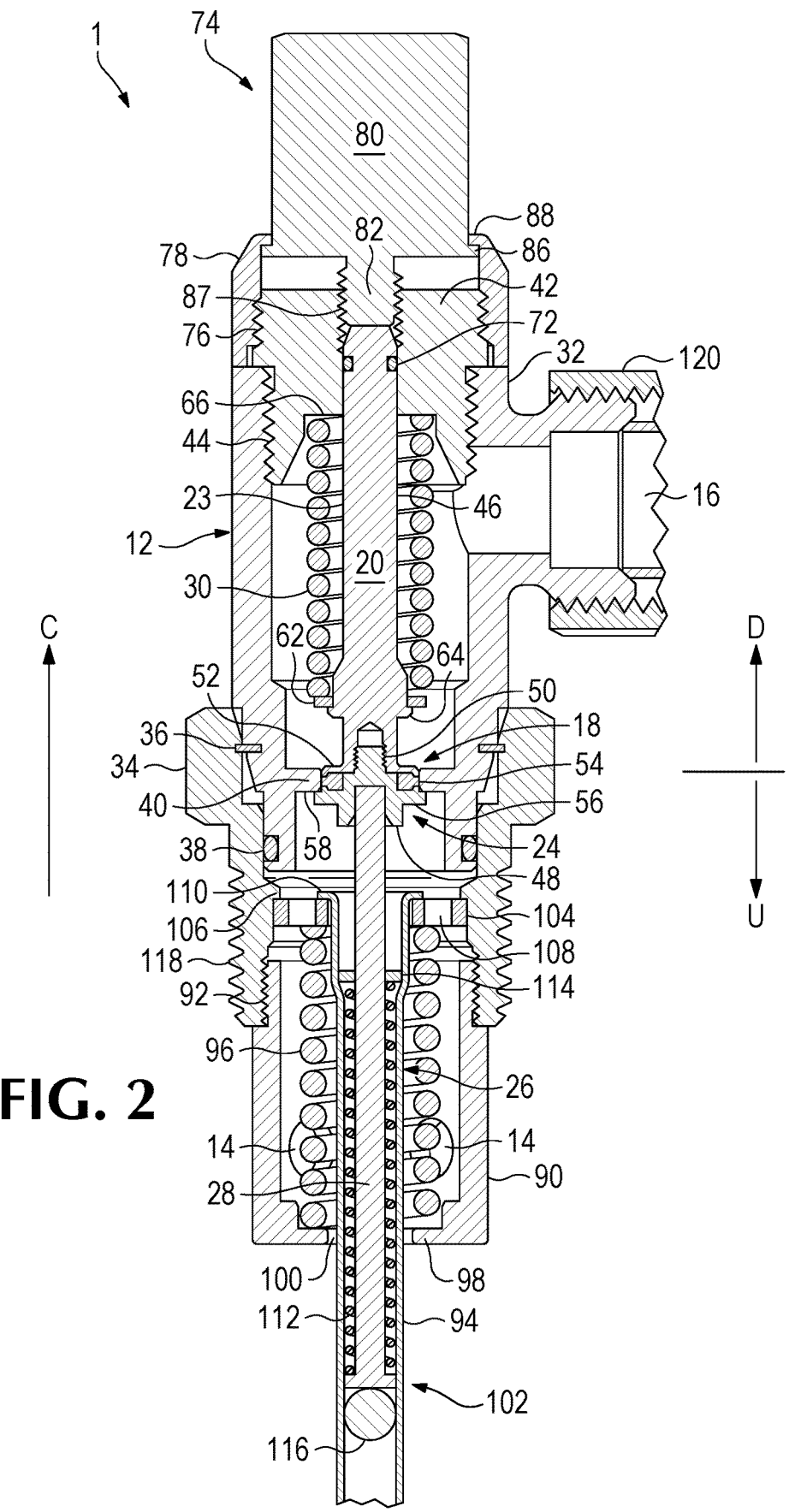
FIG. 2 is a first cross-sectional view of the valve shown in FIG. 1 in the closed condition.

The valve 1 further comprises a second spring 112 which acts to bias the temperature sensitive element 28 in a second direction (shown by the arrow C in FIG. 2). The second direction (shown by arrow C in FIG. 2) is the direction toward the outlet 16 (i.e. away from the inlet 14) or toward the downstream side D (i.e. away from the upstream side U). The second spring 112 is also referred to herein as the temperature sensitive element spring.

The body 12 of the valve 1 comprises a first body part 32 and a second body 34. Each body part 32 and 34 is open at its respective ends, and a passage is formed through the first and second body parts 32 and 34 such that fluid is able to flow through the body 12 of the valve 1, in the open condition of the valve 1, as will be further described herein. A first end of the first body part 32 is inserted into a first opening of the second body part 34 such that a portion of the body part 32 is received in the body part 34. The first opening of the second body part 34 is provided at the first end of the second body part 34. The first and second body parts 32 and 34 are connected by a clip 36, which retains the first and second body parts 32 and 34 together. The clip 36 extends between the first and second body parts 32 and 34 in the region where the portion of the first body part 32 is received in the second body part 34. A seal 38 is provided between the first and second body parts 32 and 34 to prevent fluid leaking from inside the body 12 between the two body parts 32 and 34. The seal 38 is provided between the first and second body parts 32 and 34 in the region where the portion of the first body part 32 is received in the second body part 34. The clip 36 is provided closer to the first opening of the second body part 34, into which the first end of the first body part 32 is inserted, than the seal 38 such that the clip 36 is not in contact with fluid inside the body 12 of the valve 1.

The clip 36 permits rotation of the first and second body parts 32 and 34 relative to one another.

The valve seat 18 is formed by an annular shoulder, or ledge, 40 in the first body part 32, extending from the wall of the first body part 32.

The piston member 20 is positioned in the first body part 32. The piston member 20 is held in position in the first body part 32 by a closure member 42. The closure member 42 is detachably connected with the first body part 32, such as by a screw threaded connection 44, provided by a (external) screw thread on the closure member 42 and a (internal) screw thread in the first body part 32 adjacent to the second end of the first body part 32 that is opposed to the first end that is inserted into the first opening of the second body part 34.

The piston member 20 is formed of two parts, being an elongate member 46 and a head portion member 48 that is detachably connected with the elongate member 46, such as by a screw threaded connection 50, provided by a (external) screw thread on the head portion member 48 and a (internal) screw thread in the elongate member 46.

The piston head 24 is formed by the head portion member 48 and a flange 52 provided at a first end of the elongate member 46 of the piston member 20.

The piston head 24 is provided with a seal 54. The seal 54 is sandwiched between the flange 52 and an annular shoulder 56 of the head portion member 48.

In the closed condition of the valve 1 (shown in FIG. 2), the piston head 24 seats on the valve seat 18 such that the annular shoulder 56 of the head portion member 48 abuts with a first face 58 of the annular shoulder 40, which forms the valve seat 18, and the seal 54 abuts with a surface 60 of the annular shoulder 40 that surrounds the opening 22. In the closed condition of the valve 1, the opening 22 is blocked by piston head 24 and fluid cannot pass through the valve 1.

In the open (draining) condition of the valve 1 (shown in FIG. 3), the piston head 24 is unseated from the valve seat 18 such that the annular shoulder 56 of the head portion member 48 does not abut with the first face 58 of the annular shoulder 40 and the seal 54 does not abut with the surface 60 of the annular shoulder 40 that surrounds the opening 22. In the open condition of the valve 1, the opening 22 is not blocked by the piston head 24 and fluid can pass through the valve 1.

The return spring 30 is provided on the piston member 20 such that it is provided around a portion of the elongate member 46 of the piston member 20. One end of the return spring 30 abuts against a washer 62. The washer 62 abuts against an annular shoulder 64 that extends around the piston member 20. The other end of the return spring 30 abuts against a recess 66 of the closure member 42. The end portion of the piston member 20, that is remote from the piston head 24, is received in a bore 70 that extends through the closure member 42. A seal 72 is provided between the piston member 20 and the wall of the bore 70, at the end portion of the piston member 20. The seal 72 prevents water leaking from inside the valve 1 between the piston member 20 and the closure member 42.

A manual override mechanism 74 is detachably connected with the closure member 42, such as by a screw threaded connection 76, provided by a (internal) screw thread on the closure member 42 and a (external) screw thread in the manual override mechanism 74.

The manual override mechanism 74 comprises a retention collar 78 and a knob 80. The knob 80 has a portion 82 that extends into the bore 70 in the closure member 42. The portion 82 is provided with a (external) screw thread which engages with a (internal) screw thread 84 in the bore 70 to form a screw threaded connection 87, identified in FIG. 2. The knob 80 is provided with a flange 86 and the retention collar 78 is provided with an annual shoulder 88 to retain the flange 86 and thereby the knob 80.

The knob 80 can be rotated in both directions via the screw threaded connection 87. Abutment of the flange 86 of the knob 80 with the annular shoulder 88 of the retention collar 78 prevents the knob 80 being disconnected from the closure member 42.

The body 12 further comprises a housing 90. The temperature sensing device 26 is retained by the housing 90.

The housing 90 is detachably connected with the second body part 34, such as by a screw threaded connection 92, provided by a (external) screw thread on the housing 90 and a (internal) screw thread in the second body part 34 adjacent to the second end of the second body part 34 that is opposed to the first end into which is inserted a portion of the first body part 32 as herein before described.

The housing 90 is provided with one or more openings which form the inlet 14 of the valve 1.

The temperature sensitive element 28 is provided in a casing 94. The casing 94 is of substantially tubular form.

The temperature sensing device 26 of the valve 1 further comprises a third spring (also referred to herein as an overpush spring) 96. The overpush spring 96 is provided around a portion of the casing 94. One end of the overpush spring 96 abuts against an annular shoulder 98 of the housing 90. The annular shoulder 98 surrounds an opening 100 in the housing 90. A portion 102 of the casing 94 extends out of the housing 90 through the opening 100, and forms a temperature probe that, in use, extends into the water in a solar collector panel 200, as will be further described herein. The portion 102 is arranged, in use, to be in contact with a fluid, as will be further described herein. The other end of the overpush spring 96 abuts against a retention disc 104. The retention disc 104 abuts against an annular shoulder 106 inside the second body part 34. The retention disc 104 is provided with apertures 108 for passage of water therethrough. The end of the casing 94, that is remote from the portion 102 of the casing 94 that extends out of the housing 90, is provided with a flange 110. The flange 110 abuts with the retention disc 104. The overpush spring 96 pushing against the retention disc 104 pushes the retention disc 104 and the flange 110 into abutment.

The second spring 112 is provided around the temperature sensitive element 28 inside the casing 94. The spring 112 extends between an end of the temperature sensitive element 28, which is located outside the housing 90, and a stop 114 that is located inside the casing 94 (and inside the housing 90). A ball 116 is provided at the end of the temperature sensitive element 28 inside the casing 94, in the portion 102 that extends out of the housing 90. The ball 116 may be made of silicone material. The temperature sensitive element 28 extends out of the end of the casing 94, at which the flange 110 is located, and abuts with the piston head 24. The temperature sensitive element 28 is received in a recess in the head portion member 48 of the piston head 24, of the piston member 20, such that the temperature sensitive element 28 abuts with the head portion member 48 and thereby the temperature sensing device 26 is operatively associated with the piston head 24.

The ball 116 is fitted into the casing 94 under a vacuum to ensure that there is no air entrapment. This allows the ball 116 to move up and down (as viewed in the drawings) inside the casing 94 without compressing any air.

The valve 1 is provided with a screw thread 118. The valve 1 may be connected to a solar collector panel 200 via the screw thread 118, as will be further described herein. The screw thread 118 is provided on the second body part 34 as an external screw thread. The valve 1 is shown with the screw thread 118 being a male screw thread, which is able to engage with a corresponding female screw thread on a connection fitting of the solar collector panel 200. However, as some solar collector panels 200 have a male screw thread at their connection fitting, the valve 1, as an alternative, may be provided with a suitable connection fitting having a female screw thread that is able to connect with such a male screw thread of the solar collector panel 200.

A connection fitting 120 is provided adjacent to the outlet 16 such that the outlet 16 can be connected to a drain line pipe 204, as will be further described herein. For example, the connection fitting 120 may be provided with a male or female screw thread for engagement with a corresponding female or male screw thread fitting of the pipe 204.

The temperature sensitive element 28 may comprise wax material.

The first and second springs 30 and 112 and the third spring 96 may be coil springs.

Operation

The manner of use and operation of the valve 1 will now be described.

Figure 5:
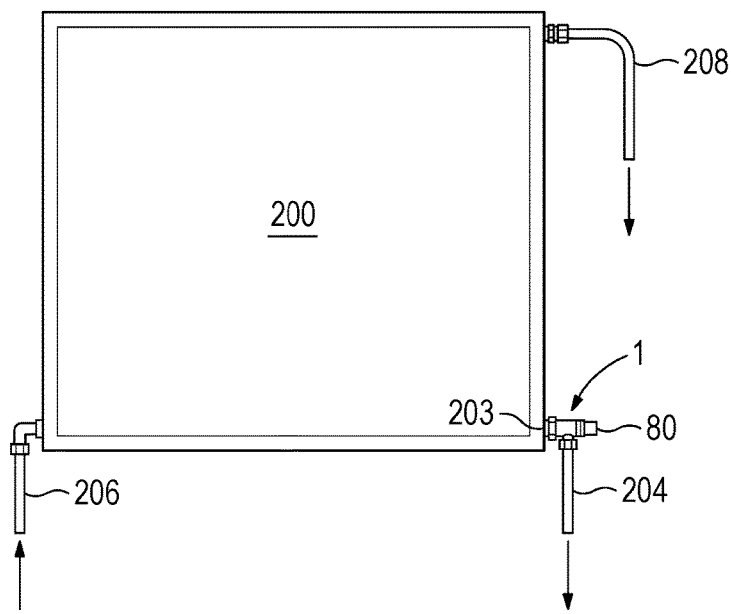
FIG. 5 is a perspective view of the valve shown in FIG. 1 connected to a solar collector panel.
Figure 5:
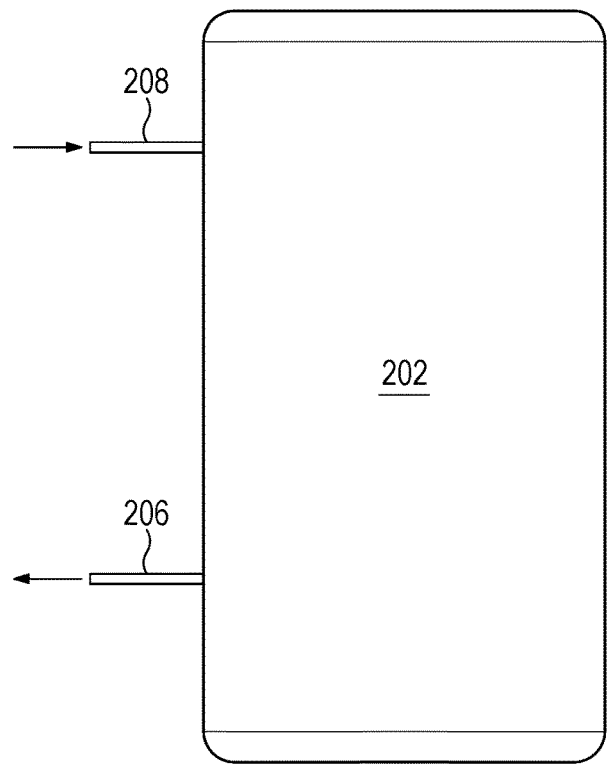
Figure 6:
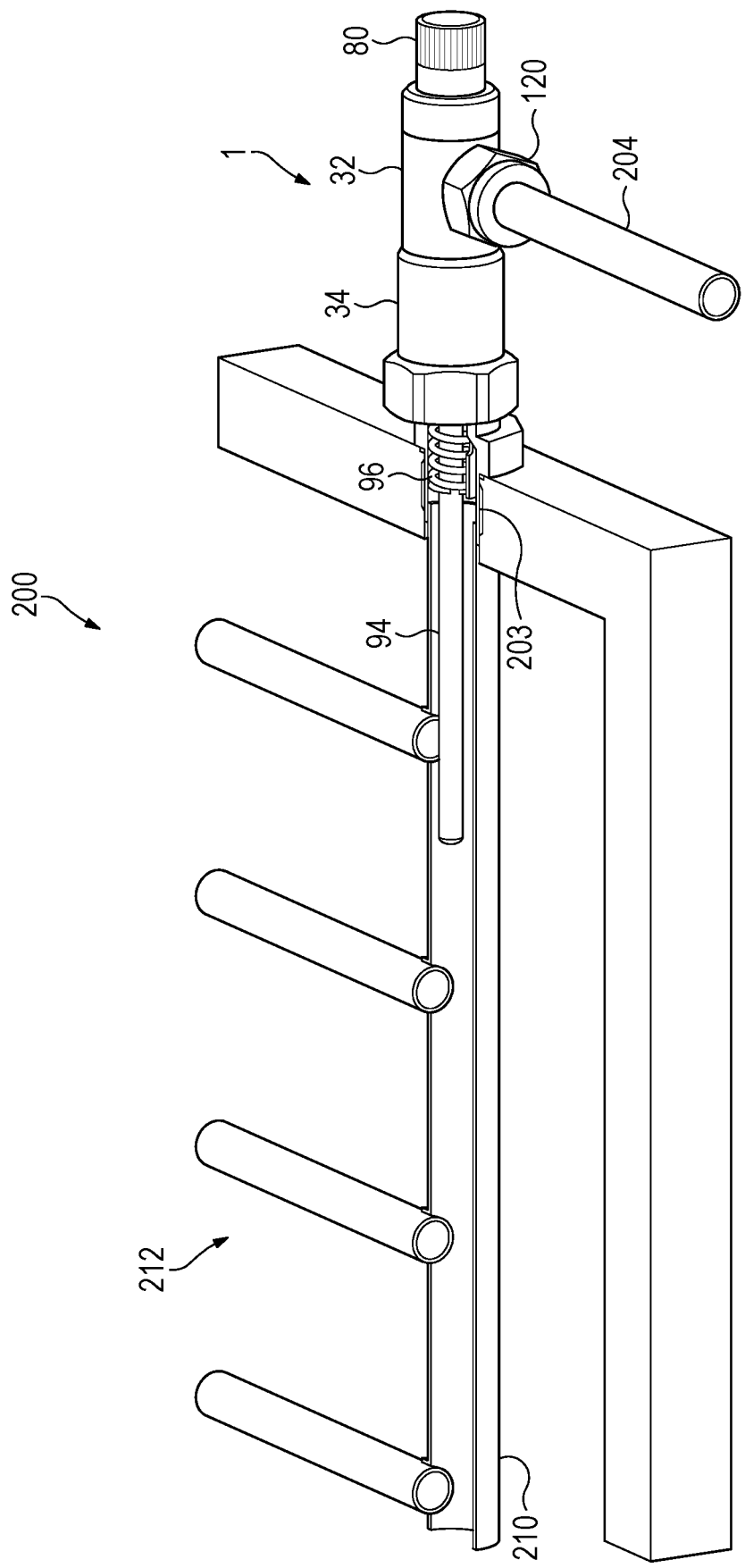
FIG. 6 is a detail perspective view of the connection of the valve to the solar collector panel, shown FIG. 5, in which the solar collector panel is partly cutaway to show the internal tubes and lower header.

In use, the valve 1 is connected to a solar collector panel 200, as is shown in FIGS. 5 and 6. The solar collector panel 200 is typically mounted on the roof of a domestic or commercial building and is connected to a hot water storage tank 202.

The installation of the valve 1 would usually be carried out by a licensed plumber in accordance with the manufacturer's instructions and the relevant regulatory requirements, e.g. in Australia, this would include Australian Standards requirements AS3500 of the Building code and any local requirements. The valve 1 is connected to the solar collector panel 200 at a lowermost part of the solar collector panel 200 such that the valve 1 is in fluid communication with the waterway within the solar collector panel 200. Solar collector panels 200 typically have a port 203 at their lowermost part that may be used for this purpose. The port 203 is normally closed off, but can be opened by removing a closure plug to expose the port 203. Thread seal tape may be wound around the screw thread 118 of the valve 1 which is then screwed into the port 203 to connect the valve 1 with the solar collector panel 200. The second body part 34 is then rotated relative to the first body part 32 (since the clip 36 permits such rotation) such that the outlet 16 of the valve 1 is orientated downwardly.

A pipe 204 is connected to the outlet 16 of the valve 1 using the connection fitting 120 of the valve 1. The pipe 204 forms a drain line so that any water that exists from the outlet 16 can be suitably directed away from the valve 1 and the solar collector panel 200 to ground level.

The solar collector panel 200 and the hot water storage tank 202 operate in conventional manner. In that regard, water that is to be heated is pumped from the hot water storage tank 202 via a pipe 206 to an inlet located at a lowermost part of the solar collector panel 200. The water is heated in the solar collector panel 200 by solar radiation. The heated water exits from an outlet at an uppermost part of the solar collector panel 200 and flows back to the hot water storage tank 200 via a pipe 208.

In conventional manner and as best seen in FIG. 6, the collector panel 200 has a lower header 210, an upper header (not shown) and tubes 212 extending between the lower header 210 and the upper header. Water from the pipe 206 enters the lower header 210, via inlet of the solar collector panel 200, and is able to enter the tubes 212 from the lower header 210 and pass into the upper header. The upper header is connected to the outlet of the solar collector panel 200 and flows back to the hot water storage tank 200 via the pipe 208.

As best seen from FIGS. 2 and 6, since the temperature sensitive element 28 extends in the second part 34 and the housing 90 of the body 12, the valve 1 is connected with the solar collector panel 200 such that the casing 94, in which the temperature sensitive element 28 is provided, is entirely exposed to (i.e. in contact with) the fluid in the lower header 210, of the solar collector panel, (since water is also able to enter the valve 1 via the inlet 14 up to the piston head 24. This ensures that the temperature sensitive element 28 senses the temperature of the water in (the lower header 210 of) the solar collector panel 200. Thus, the valve 1 is connected to the solar collector panel 200 such that the temperature probe portion 102 of the casing 94 is fully exposed to the temperature of the water inside the lower header 210 of the solar collector panel 200. This can be achieved by having the portion 102 in direct contact with water inside the solar collector panel 200, i.e. "direct thermal contact". An alternative, is to have the portion 102 in contact with an intermediate material, or materials, which is in direct thermal contact with the water inside the solar collector panel 200. This arrangement may be described as "indirect thermal contact".

As shown in FIGS. 5 and 6, the valve 1 may be connected to the solar collector panel 200 at a lowermost part of the solar collector panel 200. The valve 1 is connected to the solar collector panel 200 by the screw thread 118 engaging with a complementary screw thread on the solar collector panel 200. When the valve 1 is connected with the solar collector panel 1, the portion 102 of the casing 94 (which contains the temperature sensitive element 28), is in thermal contact with the water in the lower header 210 of the solar collector panel 200 such that the temperature sensing device 26 senses the temperature of the water.

In normal use, the temperature of the water in the solar collector panel 200 will be significantly above 0° C. and so the water will be not be at risk of freezing. In this situation, the valve 1 will be in the closed condition, as shown in FIG. 2.

However, in the event that the temperature of the water sensed by the temperature sensing device 26 falls below a predetermined level (which may sometimes occur), the valve 1 will start to open, as will be further described herein. This predetermined (temperature) level is a few degrees above 0° C., e.g. 3° C. Having the predetermined level of the temperature a few degrees above 0° C. provides a safety margin. In that regard, if the predetermined level of the water temperature to be sensed was 0° C. before the valve 1 starts to open, water in the solar collector panel 200 would already have started to freeze, potentially causing damage to the solar collector panel 200. However, having the predetermined level of the temperature of the water a few degrees above 0° C. ensures that the valve 1 will start to open before the water in the solar collector panel 200 starts to freeze.

The temperature sensitive element 28 of the temperature sensing device 26 is able to contract, or shrink, with decreases in temperature of the water in the solar collector panel 200 and expand with increases in the temperature of the water in the solar collector panel 200.

If the temperature of the water in the solar collector panel 200 sensed by the temperature sensing device 26 falls below the predetermined level, e.g. 3° C., the spring 112, within the casing 94 of the temperature sensing device 26, pushes against the contracting temperature sensitive element 28 will push against the ball 116 in the casing 94, and the ball 116 will follow the contracting temperature sensitive element 28. The contraction of the temperature sensitive element 28, in response to the fall in the sensed water temperature below the predetermined level, will allow the return spring 30 to start to unseat the piston head 24 from the valve seat 18 so that the valve 1 starts to open. When this occurs, the head portion member 48 of the piston head 24 moves out of abutment with the first face 58 of the annular shoulder 40 of the valve seat 18 and the seal 54 of the piston head 24 moves out of abutment with the surface 60 of the annular shoulder 40 that surrounds the opening 22. This allows water, which has entered the housing 90 through the openings forming the inlet 14, to start to pass through the opening 22, from the upstream side U to the downstream side D. Water exits the valve 1 via the outlet 16 and is directed away via the drain line pipe 204. As water passes from the solar collector panel 200 through the valve 1, it will be replaced by water from the hot water storage tank 202, which flows from the hot water storage tank 202 into the solar collector panel 200 via the pipe 206. The hot water storage tank 202 is insulated so the water that flows from the hot water storage tank 202 into the solar collector panel 200 will be at a higher temperature than the water in the solar collector panel 200. This results in the temperature of the water in the solar collector panel 200 rising. If the temperature of the water in the solar collector panel 200 continues to fall, the temperature sensitive element 28 will continue to contract. This will allow the return spring 30 to further unseat the piston head 24 from the valve seat 18 so that the valve 1 opens further thereby exposing more of the opening 22 such that more water can pass through the opening 22 and exit the valve 1 via the outlet 16.

When the temperature sensing device 26 senses that the temperature of the water in the solar collector panel 200 has started to rise, the temperature sensitive element 28 will start to expand and the valve 1 will start to close thereby reducing the amount of water that can flow from the solar collector panel 200 through the opening 22. When this occurs, since the temperature sensitive element 28 abuts with the piston head 24, the expanding temperature sensitive element 28 exerts a force against the ball 116 which in turn pushes the temperature sensitive element 28 against the biasing action of the return spring 30 such that the temperature sensitive element 28 causes the piston head 24 to start to move back into abutment with the valve seat 18. Once the temperature sensing device 26 has sensed that the temperature of the water in the solar collector panel 200 has risen above the predetermined level, the temperature sensitive element 28 will have expanded sufficiently to push sufficiently against the biasing action of the return spring 30 and thereby push the piston head 24 back into seating abutment with the valve seat 18 such that the head portion member 48 abuts with the first face 58 of the annular shoulder 40, which forms the valve seat 18, and the seal 54 abuts with the surface 60 of the annular shoulder 40 that surrounds the opening 22. This returns the valve 1 to its closed condition such that water can no longer flow from the solar collector panel 200 through the valve 1, and water will stop flowing from the hot water storage tank 202 to the solar collector panel 200.

As herein before described, the spring 112 within the casing 94 exerts a force against the temperature sensitive element 28 to allow the temperature sensitive element 28 to follow the ball 116 and the contracting temperature sensitive element 28. In the case of the temperature sensitive element 28 expanding, the expanding temperature sensitive element 28 exerts a force against the ball 116, which in turn pushes the temperature sensitive element 28 against the return spring 30 and pushes the piston head 24 back into seating contact with the valve seat 18.

Thus, in the operation of the temperature sensing device 26, herein before described, it is only the temperature sensitive element 28 that moves; the remainder of the temperature sensing device 26 is stationary and does not move.

Figure 4:
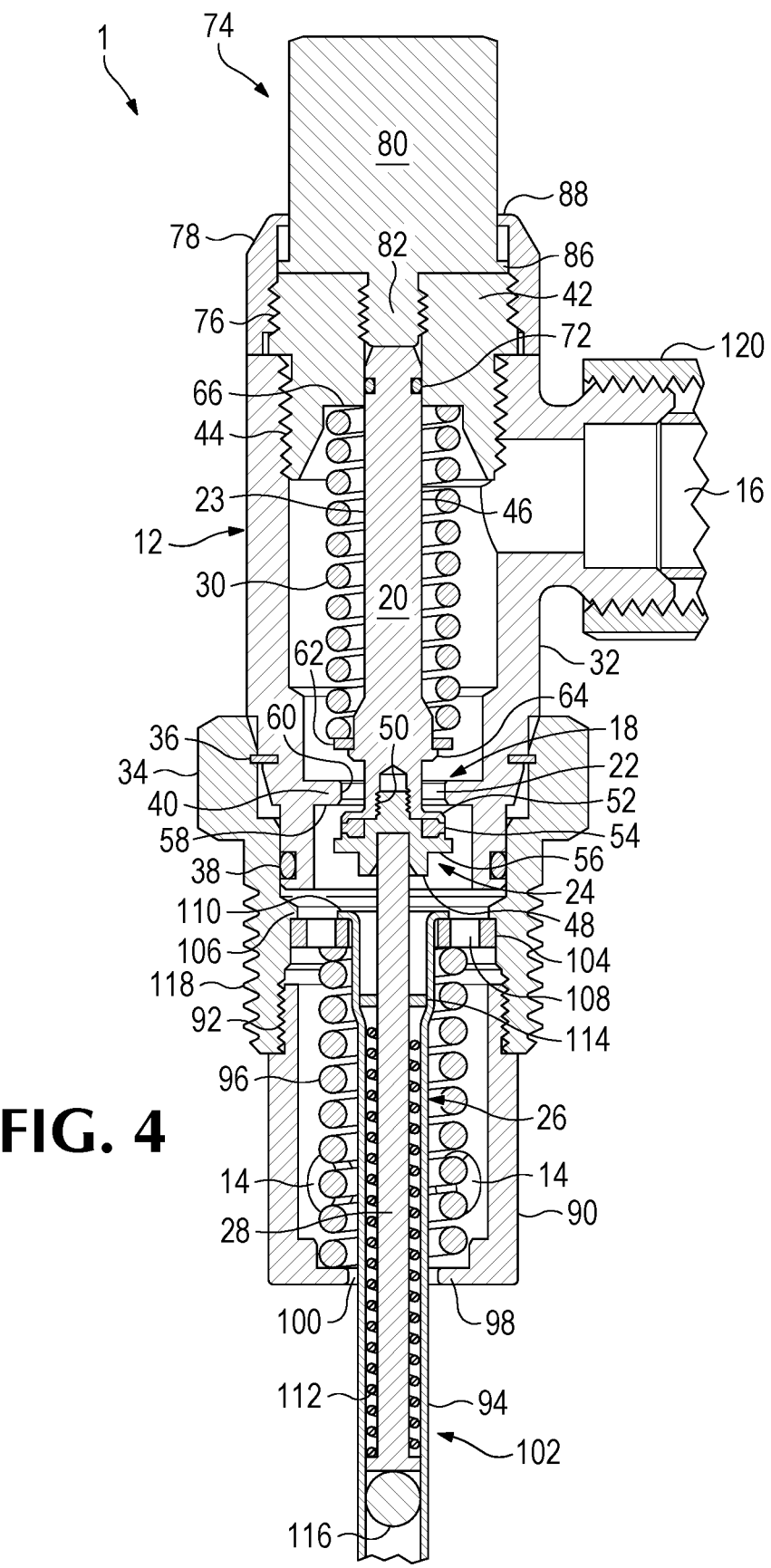
FIG. 4 is a third cross-sectional view of the valve shown in FIG. 1 in the open (flushing) condition.

The valve 1 has provision for manual flushing of the solar collector panel 200. In that regard, debris and sediment (as well as other contaminants) can sometimes collect inside the solar collector panel 200. Since solar collector panels 200 are usually mounted at an angle, such debris and sediment collects at the lowermost part inside the solar collector panel 200. Manual flushing enables the valve 1 to be opened even if the temperature sensing device 26 has not caused the valve 1 to open. The open condition of the valve 1 to allow such flushing is shown in FIG. 4. Opening the valve 1 in this manner allows water to flow through the valve 1 to flush out debris and sediment from the solar collector panel 200.

The valve 1 is opened by operating the manual override mechanism 74. In particular, the knob 80 is rotated in a first (clockwise) direction. The knob 80 is not connected to the piston member 20. In the closed condition of the valve 1 (FIG. 2), the knob abuts with the piston member 20. In the open (draining) condition of the valve 1 (FIG. 3), the knob 80 does not abut with (i.e. the knob 80 is spaced from) the piston member 20. Since the portion 82 of the knob 80 abuts with the end of the piston member 20 in the closed condition of the valve 1, rotation of the knob 80 pushes on the piston member 20, in the first direction, against the biasing action of the overpush spring 96, which compresses the overpush spring 96. This rotation of the knob 80 also pushes the temperature sensing device 26 in the first direction. This movement of the temperature sensing device 26 in the first direction moves the retention disc 104, of the temperature sensing device 26, out of abutment with the annular shoulder 106 inside the second body part 34, as can be seen in FIG. 4. Since the piston member 20 is pushed in the first direction, the piston head 24 is unseated from the valve seat 18 to open the valve 1, even though the temperature sensitive element 28 has not contracted. Water is then able to flow from the solar collector panel 200 through the valve 1 (since the water can flow from the inlet 14 through the opening 22) and debris and sediment are thereby flushed out with the water through the valve 1 and exist via the outlet 16. The water that exits from the valve 1 in this way is replaced by water that flows from the hot water storage tank 202 into the solar collector panel 200 via the pipe 206, as previously herein before described with reference to FIG. 3. When flushing has been completed, the knob 80 is rotated in the reverse direction and the piston head 24 will return to its seated position on the valve seat 18 to return the valve 1 to its closed condition. Rotating the knob 80 in the reverse direction also results in the temperature sensing device 26 moving in the second direction, under the biasing action of the spring 96, such that the retention disc 104 is moved back into abetment with the annular shoulder 106 to the position shown in FIG. 2.

The second spring 112, inside the casing 94, does not play any part in the manual flushing operation of the valve 1.

The valve 1 has relatively large water flow ways to help prevent fouling and damage to the internal valve seat 18 and seals, which may be caused by the debris and sediment which may build up in the lower water ways of solar collector panel 200.

To protect solar collector panels 200 from freeze or frost damage, each solar collector panel 200 in the installation should be provided with a valve 1, such that the valve 1 can prevent and protect from such freeze and frost of the water.

Regular flushing using the manual override mechanism 74 will assist in avoiding build-up of debris and sediment in the solar collector panel 200 and fouling of the valve 1.

As herein before described, in normal use, the temperature of the water in the solar collector panel 200 will be significantly above 0° C. and so the water will be not be at risk of freezing. In this situation, the valve 1 will be in the closed condition, as shown in FIG. 2. Consequently, since the first spring (i.e. the return spring) 30 is provided at the downstream side D (as is the piston shaft 23), under normal use it will be dry since it will not be in contact with fluid (and any debris, sediments or other contaminants in the fluid) in the solar collector panel 200. This will assist in prolonging the useful life of the first spring 30.

The portion of the valve 1 that is outside the solar collector panel 200 may be insulated. This may be achieved, for example, using a moulded insulation cover that closely fits over the portion of the valve 1 that is outside the solar collector panel 200, i.e. like a glove, leaving only the knob 80 exposed for access to perform manual flushing. The moulded insulation cover may be made of suitable insulation material, e.g. rubber, plastic and/or foam. Insulating the portion of the valve 1 that is outside the solar collector panel 200 reduces heat losses from the water in the solar collector panel 200 via the valve 1 to the ambient environment. Consequently, this provides assurance that the temperature of the water in the solar collector panel is not being lowered due to heat losses via the valve 1. If such heat losses did occur, it would mean that the valve 1 would open to drain water sooner than it would need to compared to when insulation is used, which would be wasteful of heated water since heated water form the hot water storage tank 202 replaces water that is drained from the solar collector panel by the valve 1.

Whilst one or more preferred embodiments of the present invention have been herein before described, the scope of the present invention is not limited to those specific embodiments, and may be embodied in other ways, as will be apparent to a skilled addressee.

Modifications and variations such as would be apparent to a person skilled in the art are deemed to be within the scope of the present invention.

What is claimed is:

1. A freeze prevention valve comprising:
a body,
the body having an inlet for fluid to enter the valve and an outlet for fluid to exit the valve in an open condition of the valve,
a valve seat provided adjacent an opening in the body of the valve,
a piston member that is movable in the body of the valve, the piston member comprising a piston shaft and a piston head, the piston head arranged to seat against the valve seat in a closed condition of the valve and unseat from the valve seat in the open condition of the valve,
a temperature sensing device, operatively associated with the piston head, the temperature sensing device comprising a temperature sensitive element, wherein the temperature sensitive element contracts when the temperature of a fluid sensed by the temperature sensing device decreases and expands when the temperature of the fluid sensed by the temperature sensing device increases,
a return spring to bias the piston member in a first direction to the open condition of the valve,
the valve having an upstream side and a downstream side which are not in fluid communication in the closed condition of the valve and which are in fluid communication in the open condition of the valve,
wherein the temperature sensing device is provided on the upstream side and the return spring is provided on the downstream side,
wherein, in use, when the temperature of the fluid sensed by the temperature sensing device falls below a predetermined level, contraction of the temperature sensitive element allows the return spring to move the piston member to unseat the piston head from the valve seat and thereby open the valve to allow fluid to pass through the valve, and when the temperature of the fluid sensed by the temperature sensing device rises above the predetermined level, expansion of the temperature sensitive element moves the piston member in a second direction, opposed to the first direction, to seat the piston head on the valve seat and thereby return the valve to the closed condition to prevent fluid to pass through the valve, and
wherein the valve further comprises a manually operable control mechanism and an overpush spring, the manually operable control mechanism being operable to unseat the piston head from the valve seat to move the valve from the closed condition to the open condition to permit fluid to pass through the valve, and when the manually operable control mechanism is operated to unseat the piston head from the valve seat to move the valve from the closed condition to the open condition, the temperature sensing device moves in the first direction, and wherein when the manually operable control mechanism is operated to allow the piston head to re-seat on the valve seat, the overpush spring acts to bias the temperature sensing device in the second direction such that the piston head seats on the valve seat to return the valve to the closed condition to prevent fluid from passing through the valve.

2. A valve according to claim 1, wherein the piston shaft is provided on the downstream side.

3. A valve according to claim 2, wherein the manually operable control mechanism comprises a knob and a retention collar to retain the knob, the manually operable control mechanism being detachably connected with a closure member that is detachably connected with the body, and wherein a bore extends through the closure member and the knob has a portion that extends into the bore and an end portion of the piston member is received in the bore, and wherein the portion of the knob that extends into the bore abuts with the end of the piston member in the closed condition of the valve, such that rotation of the knob pushes the piston member in the first direction against the biasing action of the overpush spring and the piston head is unseated from the valve seat to open the valve and rotation of the knob in the reverse direction allows the piston head to re-seat on the valve seat to return the valve to the closed condition.

4. A valve according to claim 1, wherein the body comprises at least a first body part and a second body part that are rotatably connected together.

5. A valve according to claim 4, wherein the body further comprises a housing to retain the temperature sensing device.

6. A valve according to claim 4, wherein at least one seal is provided between the first body part and the second body part, in use, to prevent fluid leaking between the first body part and the second body part from inside the body.

7. A solar collector panel having a valve, according to claim 1, connected thereto such that, in use, if the temperature of the water in the solar collector panel sensed by the temperature sensing device falls below the predetermined level, water from the solar collector panel exits the valve via the outlet of the valve and is replaced by warmer water from a hot water storage tank that is connected to the solar collector panel.

8. A solar collector panel according to claim 4, wherein the temperature sensitive element is provided in a casing, and the casing is entirely exposed to the water in the solar collector panel.

9. A solar collector panel according to claim 4, wherein the predetermined level is substantially 3° C.

10. A solar collector panel according to claim 4, wherein a portion of the valve that is outside the solar collector panel is insulated with insulation material to reduce heat loss from the water in the solar collector panel via the valve.

11. A valve according to claim 1, wherein the piston head is provided on the upstream side of the valve, and wherein the valve seat is formed by an annular shoulder in the body, and wherein the piston head is provided with a head portion member, such that in the closed condition of the valve, the head portion member abuts with a face of the annular shoulder.

12. A valve according to claim 1, further comprising a temperature sensitive element spring to bias the temperature sensitive element in the second direction.

13. A valve according to claim 1, wherein the operative association of the temperature sensing device with the piston head comprises the temperature sensitive element being in direct or indirect abutment with the piston head.

14. A valve according to claim 1, wherein the piston head is provided with a seal which contacts the valve seat to close the valve to thereby prevent passage of fluid through the valve.

15. A valve according to claim 1, wherein the temperature sensing element is provided in a casing and the overpush spring is provided around a portion of the casing on the upstream side of the valve.

* * * * *

UNITED STATES PATENT AND TRADEMARK OFFICE
CERTIFICATE OF CORRECTION

PATENT NO. : 10,823,304 B2
APPLICATION NO. : 16/310304
DATED : November 3, 2020
INVENTOR(S) : Peter John Morris It is certified that error appears in the above-identified patent and that said Letters Patent is hereby corrected as shown below:

In the Specification

At Column 4, Line 47-48:
"(shown by the arrow 0 in FIG. 3)"
Should read:
--(shown by arrow O in FIG. 3)--.

At Column 4, Line 49:
"(shown by the arrow 0 in FIG. 3)"
Should read:
--(shown by arrow O in FIG. 3)--.

In the Claims

In Claim 8, at Column 14, Line 1:
"A solar collector panel according to claim 4"
Should read:
--A solar collector panel according to claim 7--.

In Claim 9, at Column 14, Line 5:
"A solar collector panel according to claim 4"
Should read:
--A solar collector panel according to claim 7--.

In Claim 10, at Column 14, Line 7:
"A solar collector panel according to claim 4"
Should read:
--A solar collector panel according to claim 7--.

Signed and Sealed this
Twenty-fifth Day of October, 2022

*Katherine Kelly Vidal*

Katherine Kelly Vidal
*Director of the United States Patent and Trademark Office*